US011871491B1

(12) United States Patent
Chen et al.

(10) Patent No.: US 11,871,491 B1
(45) Date of Patent: *Jan. 9, 2024

(54) LIGHTING APPARATUS

(71) Applicant: LEEDARSON LIGHTING CO., LTD., Fujian (CN)

(72) Inventors: Yizhen Chen, Fujian (CN); Yongzhe Dong, Fujian (CN); Shuxing Gao, Fujian (CN); Zhenyu Tang, Fujian (CN); Huiwu Chen, Fujian (CN); Bihong Zheng, Fujian (CN); Weize Lin, Fujian (CN); Zhiwei Su, Fujian (CN)

(73) Assignee: LEEDARSON LIGHTING CO., LTD., Fujian (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/978,152

(22) Filed: Oct. 31, 2022

Related U.S. Application Data

(63) Continuation-in-part of application No. 17/962,045, filed on Oct. 7, 2022.

(51) Int. Cl.

| | |
|---|---|
| ***H05B 45/30*** | (2020.01) |
| ***F21V 21/04*** | (2006.01) |
| ***F21V 7/10*** | (2006.01) |
| ***F21V 29/502*** | (2015.01) |
| *F21Y 115/10* | (2016.01) |

(52) U.S. Cl.
CPC ............... *H05B 45/30* (2020.01); *F21V 7/10* (2013.01); *F21V 21/04* (2013.01); *F21V 29/502* (2015.01); *F21Y 2115/10* (2016.08)

(58) Field of Classification Search
CPC ........................................................ F21S 8/04
See application file for complete search history.

(56) References Cited

U.S. PATENT DOCUMENTS

| | | | | |
|---|---|---|---|---|
| 9,892,693 | B1 * | 2/2018 | Kumar | G09G 3/3413 |
| 2022/0159806 | A1 * | 5/2022 | Han | H05B 45/36 |
| 2022/0163174 | A1 * | 5/2022 | Huang | F21V 23/0485 |
| 2023/0032592 | A1 * | 2/2023 | Kim | F21V 23/006 |
| 2023/0111141 | A1 * | 4/2023 | Skarda | F21V 23/0435 362/85 |

* cited by examiner

*Primary Examiner* — Christopher E Dunay
(74) *Attorney, Agent, or Firm* — Chun-Ming Shih; LANWAY IPR SERVICES

(57) ABSTRACT

A lighting apparatus includes a base plate, a driver module, a light source, a mechanical switch, a main housing, and a manual switch. The driver module is disposed on a top surface of the base plate. The light source is also disposed on the top surface of the base plate. The mechanical switch is disposed on the base plate. The mechanical switch has multiple states to be selected. The driver reads a selected state to control the light source. The main housing encloses the base plate. The manual switch is disposed on the main housing. An operating part of the manual switch is exposed outside the main housing to be operated by a user. When a user moves the operating part of the manual switch, the connecting part of the manual switch carries the mechanical switch to change the selected state.

20 Claims, 15 Drawing Sheets

LIGHTING APPARATUS

RELATED APPLICATION

The present application is a CIP applications of U.S. patent application Ser. No. 17/962,045.

FIELD

The present invention is related to a lighting apparatus, and more particularly related to a lighting apparatus with a compact assembly structure.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

In conventional design, light devices has a certain height and thus people need to reserve a sufficient space for installing such light devices. If the light device can be designed with a smaller height, it helps a lot on saving installation space and enhances convenience of installation of light devices.

However, it is difficult to decrease the height of a light device. Therefore, it is beneficial to find innovation ways to re-design light devices to satisfy various needs of light devices.

SUMMARY

In some embodiments, a lighting apparatus includes a base plate, a driver module, a light source and a main housing.

The base plate includes a metal layer, an insulation layer, and a conductive path layer.

The conductive path layer is stacked above the insulation layer.

The insulation layer is stacked above the metal layer.

The driver module is disposed on a top surface of the conductive path layer.

The light source is also disposed on the top surface of the base plate.

The main housing encloses the base plate.

The metal layer has a first thickness.

The conductive path layer has a second thickness. 10% of the first thickness is larger than the second thickness.

In some embodiments, the metal layer has a first section and a second section.

The first section and the second section are separated with a heat insulation material.

The light source is placed above the first section and the driver module is placed above the second section.

In some embodiments, the main housing has a heat sink thermally connected to the first section of the metal layer.

In some embodiments, the main housing is a cup shape with a light opening.

The base plate is disposed on an inner side of the main housing facing to the light opening.

In some embodiments, a power socket is placed on a back cover of the main housing.

A power wire is inserted to the power socket for guiding an AC power directly to the driver module disposed on the base plate.

In some embodiments, a reflector cup is placed for reflecting a light of the light source to the light opening.

The reflector has a trumpet shape with a first reflector opening facing to the light source and with a second reflector opening facing to the light opening.

The second reflector opening is larger than the first reflector opening.

The reflector cup separates the light source from the driver module on the base plate.

The reflector cup conceals the driver module behind the reflector cup so as the driver module is not visible from the light opening.

In some embodiments, the reflective cup has a reflective layer and a thermal layer.

The reflective layer faces to the light source to direct the light to the light opening.

The reflective cup engages the base plate to carry heat of the base plate to the main housing.

In some embodiments, the thermal layer includes a metal material.

In some embodiments, the main housing has a rim part extending from the light opening for concealing an installation hole for installing the lighting apparatus.

An antenna is placed on the rim part connecting to the driver module for receiving an external command.

In some embodiments, an augment switch is integrated with the antenna and is placed on a bottom surface of the rim part exposed to be operated by a user when the lighting apparatus is installed in the installation hole.

In some embodiments, a mechanical switch is placed on the base plate.

A manual switch is placed on a lateral side of the main housing.

The manual switch is partly exposed outside the main housing for a user to select a state from multiple candidate states.

When the manual switch is moved, the manual switch carries the mechanical switch to move to change an operation parameter of the driver module.

In some embodiments, a lens layer is disposed above the light source.

In some embodiments, a buckle structure is disposed on the lens layer to align the lens layer with the light source.

In some embodiments, the lighting apparatus may also include a mechanical switch and a manual switch.

The mechanical switch is disposed on the base plate.

The mechanical switch is coupled to the driver module.

The mechanical switch has multiple states to be selected.

The driver reads a selected state to control the light source.

A manual switch disposed on the main housing.

An operating part of the manual switch is exposed outside the main housing to be operated by a user.

A connecting part of the manual switch is coupled to the mechanical switch.

When a user moves the operating part of the manual switch, the connecting part of the manual switch carries the mechanical switch to change the selected state.

In some embodiments, a switch hole is disposed on the base plate for fixing the mechanical switch.

In some embodiments, the connecting part and the mechanical switch are coupled on a side of the base plate opposite to the top surface.

In some embodiments, the connecting part of the manual switch is a switch groove.

A protruding pin of the mechanical switch is inserted into the switch groove.

In some embodiments, the driver module includes multiple driver circuits placed in a peripheral area of the base plate.

The light source is placed in a central area of the base plate.

In some embodiments, the multiple driver circuits comprise an electrolysis capacitor.

The electrolysis capacitor has two feet connected to the base plate.

The two feet of the electrolysis capacitor are bent more than 40 degrees.

In some embodiments, the electrolysis capacitor has a capacitor body kept non-contact to the top surface of the base plate.

In some embodiments, a lighting apparatus includes a base plate, a driver module, a light source, a mechanical switch, a main housing, and a manual switch.

The driver module is disposed on a top surface of the base plate.

The light source is also disposed on the top surface of the base plate.

The mechanical switch is disposed on the base plate.

The mechanical switch is coupled to the driver module.

The mechanical switch has multiple states to be selected.

The driver reads a selected state to control the light source.

The main housing encloses the base plate.

The manual switch is disposed on the main housing.

An operating part of the manual switch is exposed outside the main housing to be operated by a user.

A connecting part of the manual switch is coupled to the mechanical switch.

When a user moves the operating part of the manual switch, the connecting part of the manual switch carries the mechanical switch to change the selected state.

In some embodiments, a switch hole is disposed on the base plate for fixing the mechanical switch.

In some embodiments, the connecting part and the mechanical switch are coupled on a side of the base plate opposite to the top surface.

In some embodiments, the connecting part of the manual switch is a switch groove.

A protruding pin of the mechanical switch is inserted into the switch groove.

In some embodiments, the connecting part is a protruding lever inserting into the mechanical switch.

In some embodiments, the mechanical switch is moved for coupling a different resistor combination to multiple transistors corresponding to different selected states.

The transistors respectively determine driving currents supplied to multiple types of LED modules of the light source associated to the coupled resistor combination to emit a mixed light corresponding to the selected state.

In some embodiments, the multiple types of LED modules comprise a first LED set emitting a first light of a first color temperature and includes a second LED set emitting a second light of a second color temperature.

In some embodiments, there are more than three resistor combinations to select from the mechanical switch.

In some embodiments, the multiple transistors comprise a first transistor selectively connects to one of five first resistors and comprise a second transistor selectively connects to one of five second resistors.

The connected first resistor and the connected second resistor determine a current ratio between a first driving current supplied to the first LED set and a second driving current supplied to the second LED set.

In some embodiments, a Zeiner diode is coupled to gates of the first transistor and the second transistor.

In some embodiments, the main housing is a cup shape with a light opening.

The base plate is disposed on an inner side of the main housing facing to the light opening.

In some embodiments, a power socket is placed on a back cover of the main housing.

A power wire is inserted to the power socket for guiding an AC power directly to the driver module disposed on the base plate.

In some embodiments, a reflector cup is placed for reflecting a light of the light source to the light opening.

The reflector has a trumpet shape with a first reflector opening facing to the light source and with a second reflector opening facing to the light opening.

The second reflector opening is larger than the first reflector opening.

The reflector cup separates the light source from the driver module on the base plate.

The reflector cup conceals the driver module behind the reflector cup so as the driver module is not visible from the light opening.

In some embodiments, the main housing has a rim part extending from the light opening for concealing an installation hole for installing the lighting apparatus.

An antenna is placed on the rim part connecting to the driver module for receiving an external command.

In some embodiments, an augment switch is integrated with the antenna and is placed on a bottom surface of the rim part exposed to be operated by a user when the lighting apparatus is installed in the installation hole.

In some embodiments, the driver module includes multiple driver circuits placed in a peripheral area of the base plate.

The light source is placed in a central area of the base plate.

In some embodiments, the multiple driver circuits comprise an electrolysis capacitor.

The electrolysis capacitor has two feet connected to the base plate.

The two feet of the electrolysis capacitor are bent more than 40 degrees.

In some embodiments, the electrolysis capacitor has a capacitor body kept non-contact to the top surface of the base plate.

In some embodiments, a silicone glue is disposed between the capacitor body and the top surface of the base plate.

In some embodiments, the driver module has two charging stages.

An inductor is charged first and supplying a driving current to the light source.

The inductor charges a capacitor and the capacitor supplies the driving current to the light source.

DETAILED DESCRIPTION

Figure 1:
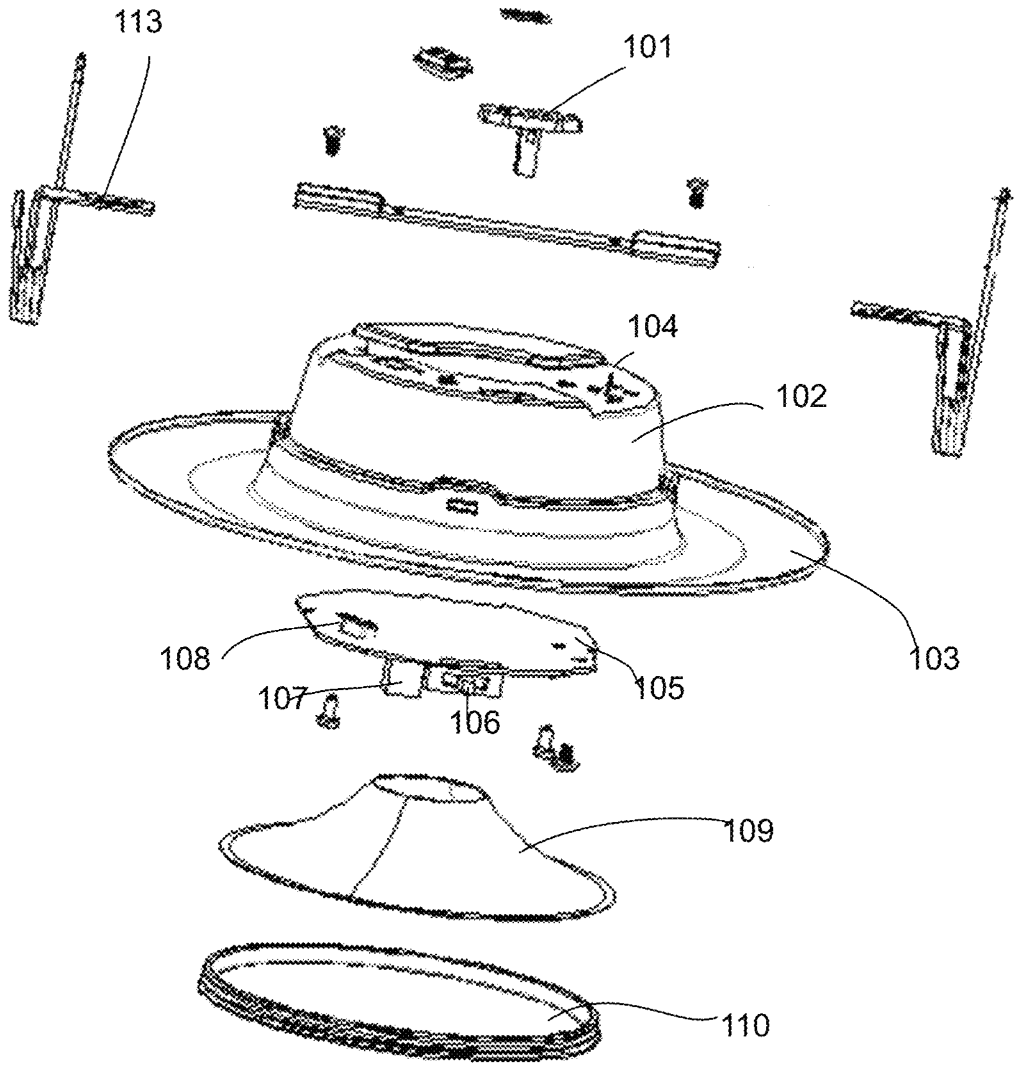
FIG. 1 illustrates an exploded view of an embodiment of a lighting apparatus.

In FIG. 1, a lighting apparatus includes a base plate 105, a driver module 107, a light source 106, a mechanical switch 107, a main housing 102, and a manual switch 101.

The driver module 107 is disposed on a top surface of the base plate 105.

The light source 106 is also disposed on the top surface of the base plate 105.

The mechanical switch 108 is disposed on the base plate 105.

The mechanical switch 108 is coupled to the driver module 107. For example, the mechanical switch 108 may have a sliding pin that can be moved to stay at several positions. Each position routes one or more electronic components to render a detectable state, e.g. a resistance value. The driver module may have a controller that reads the resistance value or a derived value and determines accordingly how to control the light source 106, e.g. to change to another color temperature, another color, or other types of control.

The base plate 105 is installed to the main housing 102. The main housing 102 has a rim part for concealing an installation hole for installing the lighting apparatus. Such installation hole may be a hole reserved in a ceiling or an installation box for installing the lighting apparatus.

The main housing 102 has a back cover 104 with a hole so that a connecting part of the manual switch 101 is coupled to the mechanical switch 108. There are two fixing arms 113 for attaching the main housing 103 to an installation box or an installation hole.

There is a reflector cup 109 with a trumpet shape. The narrow side faces to the light source 106 and the lateral wall separates the light source 106 from the driver module 107. Such design increases light efficiency for the driver module 108 does not affect light movement.

There is also a light passing cover 110 that may have a lens or a light diffusion layer.

Figure 2:
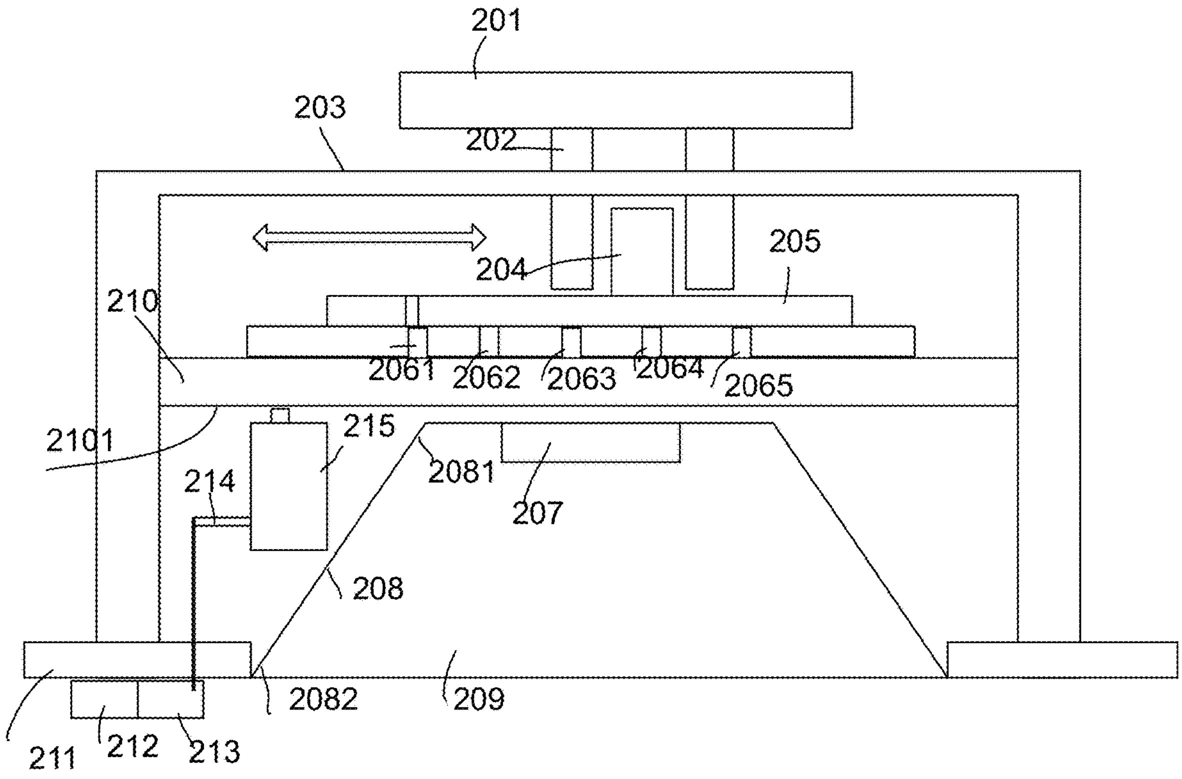
FIG. 2 illustrates a sectional view of a lighting apparatus embodiment.

FIG. 2 shows a second embodiment of a lighting apparatus.

In FIG. 2, there is a manual switch 201 with a connecting part 202 that is coupled to a mechanical switch 205. In this example, the connecting part 202 forms a groove for a protruding pin 204 of the mechanical switch to insert. The connecting part 202 may carry the protruding pin 204 to move to align with one of five option positions 2061, 2062, 2063, 2064, 2065.

A driver module 215, a light source 207 and the mechanical switch 205 are placed on the base plate 210. The driver module 215 and the light source 207 are both placed at the top surface 2101 of the base plate 210.

There is a reflector cup 208 with a first reflector opening 2081 facing to the light source 207. The reflector cup 208 has a second reflector opening 2082 facing to the light opening 209. The second reflector opening 2082 is larger than the first reflector opening 2081.

The main housing 203 has a rim part 211.

In some embodiments, an antenna 212 and an augment switch 213 are integrated as a module installed on a bottom surface of the rim part 211 facing downwardly to users. The antenna 212 and the augment switch 213 are connected to the driver module 215 via a conductive path 214 disposed in the main housing 203.

The manual switch 201 is concealed by the rim part 211 when the lighting apparatus is installed. The augment switch 213 is exposed to users to operate so as to continue adjust the setting of the driver module 214.

In some embodiments, the augment switch 213 and the manual switch 201 handle different settings. For example, the manual switch 201 may be controlled to set a base color temperature or a color while the augment switch 213 is used for setting a working mode.

In addition, the antenna 212 exposed outside the main housing 203 ensures wireless signals being received successfully.

In some embodiments, the rim part 211 may be detached to replace with another rim part so as to change to a different setting, e.g. from a Bluetooth device to a Wi-Fi device when two rim parts respectively include Bluetooth component and Wi-Fi component. By selecting a different rim part 211 to attach to the main housing 203, a different function is provided.

Such design is flexible and useful on reducing stock cost.

The mechanical switch multiple states to be selected.

The driver reads a selected state to control the light source.

The main housing encloses the base plate.

The manual switch is disposed on the main housing.

An operating part of the manual switch is exposed outside the main housing to be operated by a user.

A connecting part of the manual switch is coupled to the mechanical switch.

When a user moves the operating part of the manual switch, the connecting part of the manual switch carries the mechanical switch to change the selected state.

In some embodiments, a switch hole is disposed on the base plate for fixing the mechanical switch.

In some embodiments, the connecting part and the mechanical switch are coupled on a side of the base plate opposite to the top surface.

In some embodiments, the connecting part of the manual switch is a switch groove.

A protruding pin of the mechanical switch is inserted into the switch groove.

In some embodiments, the connecting part is a protruding lever inserting into the mechanical switch.

In some embodiments, the mechanical switch is moved for coupling a different resistor combination to multiple transistors corresponding to different selected states.

Figure 6:
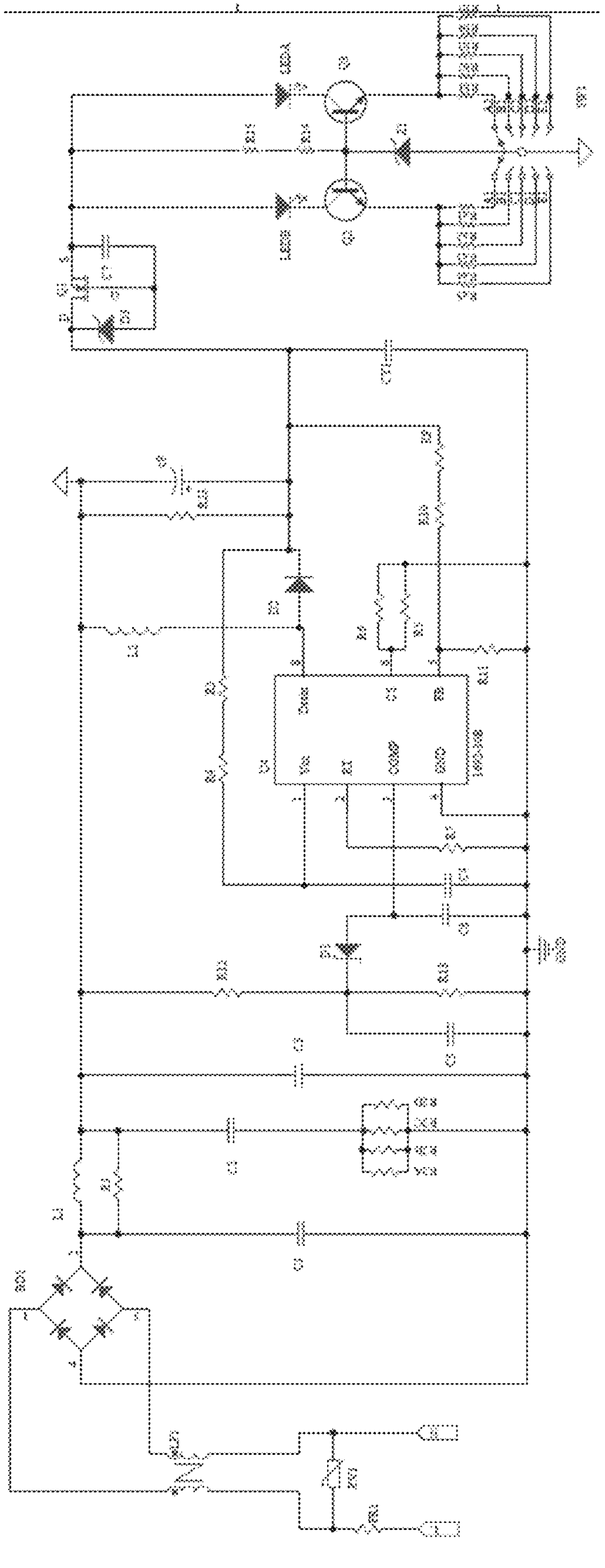
FIG. 6 illustrates a detailed circuit diagram example of a lighting apparatus.

In the circuit example of FIG. 6, there are two transistors 601, 602. The mechanical switch 603 is operated to couple different resistor combination 604 to the transistors 601, 602.

The transistors respectively determine driving currents supplied to multiple types of LED modules 605, 606 of the light source associated to the coupled resistor combination to emit a mixed light corresponding to the selected state.

In some embodiments, the multiple types of LED modules comprise a first LED set emitting a first light of a first color temperature and includes a second LED set emitting a second light of a second color temperature.

In some embodiments, there are more than three resistor combinations to select from the mechanical switch. In the example of FIG. 6, there are two sets of five resistor combinations 604.

In FIG. 6, the multiple transistors comprise a first transistor selectively connects to one of five first resistors and comprise a second transistor selectively connects to one of five second resistors.

The connected first resistor and the connected second resistor determine a current ratio between a first driving current supplied to the first LED set and a second driving current supplied to the second LED set.

In FIG. 6, a Zeiner diode 607 is coupled to gates of the first transistor and the second transistor.

In some embodiments, the main housing is a cup shape with a light opening.

The base plate is disposed on an inner side of the main housing facing to the light opening.

In some embodiments, a power socket is placed on a back cover of the main housing.

A power wire is inserted to the power socket for guiding an AC power directly to the driver module disposed on the base plate.

Figure 3:
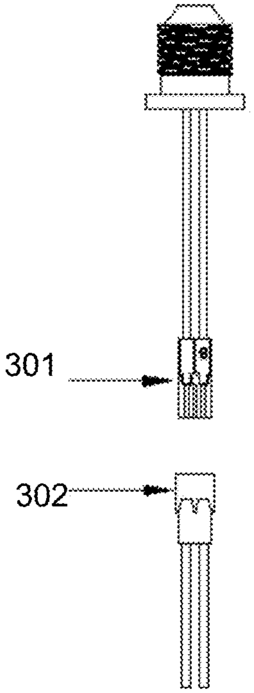
FIG. 3 illustrates a connecting wire example.

FIG. 3 shows a power wire 301 with one end having an Edison cap to connect to an external AC (Alternative Current) power source like 110V AC power source.

There is a power socket 302 to connect to the power wire 301. The power socket 302 may be placed on the back cover of the main housing for guiding an external AC power to the driver module.

In the embodiments mentioned above, there is no additional driver circuit except the driver module ton the base plate, which may be regarded as a DoB (Device on Board) solution. Unlike other downlight devices that need an additional driver box, the embodiments mentioned here incorporate the driver circuits directly on the base plate which is also used for holding the light source.

In some embodiments, a reflector cup is placed for reflecting a light of the light source to the light opening.

The reflector has a trumpet shape with a first reflector opening facing to the light source and with a second reflector opening facing to the light opening.

The second reflector opening is larger than the first reflector opening.

The reflector cup separates the light source from the driver module on the base plate.

The reflector cup conceals the driver module behind the reflector cup so as the driver module is not visible from the light opening.

In some embodiments, the main housing has a rim part extending from the light opening for concealing an installation hole for installing the lighting apparatus.

An antenna is placed on the rim part connecting to the driver module for receiving an external command.

In some embodiments, an augment switch is integrated with the antenna and is placed on a bottom surface of the rim part exposed to be operated by a user when the lighting apparatus is installed in the installation hole.

In some embodiments, the driver module includes multiple driver circuits placed in a peripheral area of the base plate.

The light source is placed in a central area of the base plate.

In some embodiments, the multiple driver circuits comprise an electrolysis capacitor.

Figure 8:
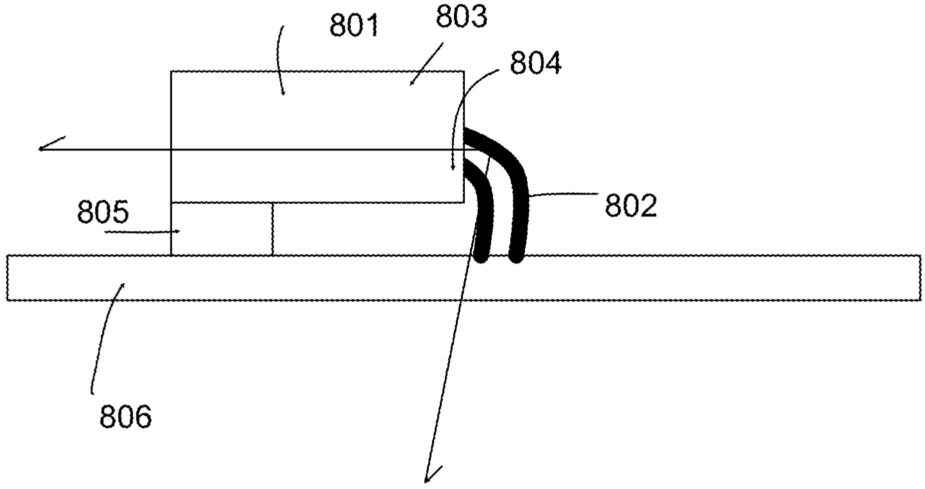
FIG. 8 illustrates an arrangement of a preferred installation manner of an electrolysis capacitor on a base plate.

In FIG. 8, the electrolysis capacitor 801 has two feet 802 connected to the base plate 806.

The two feet 802 of the electrolysis capacitor 801 are bent so that the angle between the axial direction and the surface of the base plate 806 is more than 40 degrees.

In FIG. 8, the electrolysis capacitor 801 has a capacitor body 803 kept non-contact to the top surface of the base plate 806.

In FIG. 8, a silicone glue 805 is disposed between the capacitor body 803 and the top surface of the base plate 806.

In some embodiments, the driver module has two charging stages.

An inductor is charged first and supplying a driving current to the light source.

The inductor charges a capacitor and the capacitor supplies the driving current to the light source.

Figure 4:
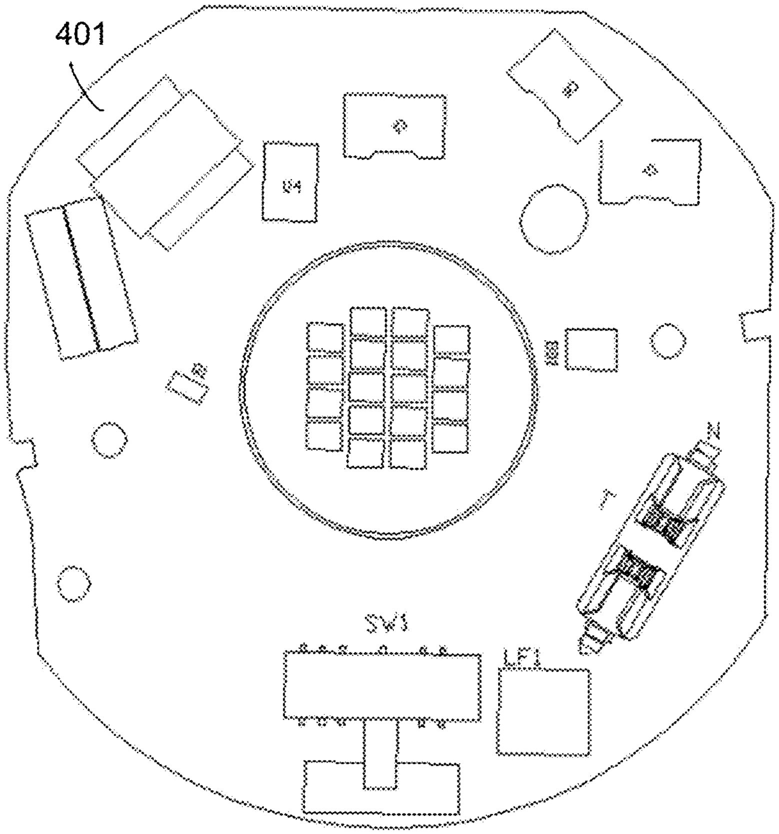
FIG. 4 illustrates a first type of a light source circuit board.

FIG. 4 shows an example with the inductor and capacitor components 401 to perform the two-steps driving solution.

Figure 5:
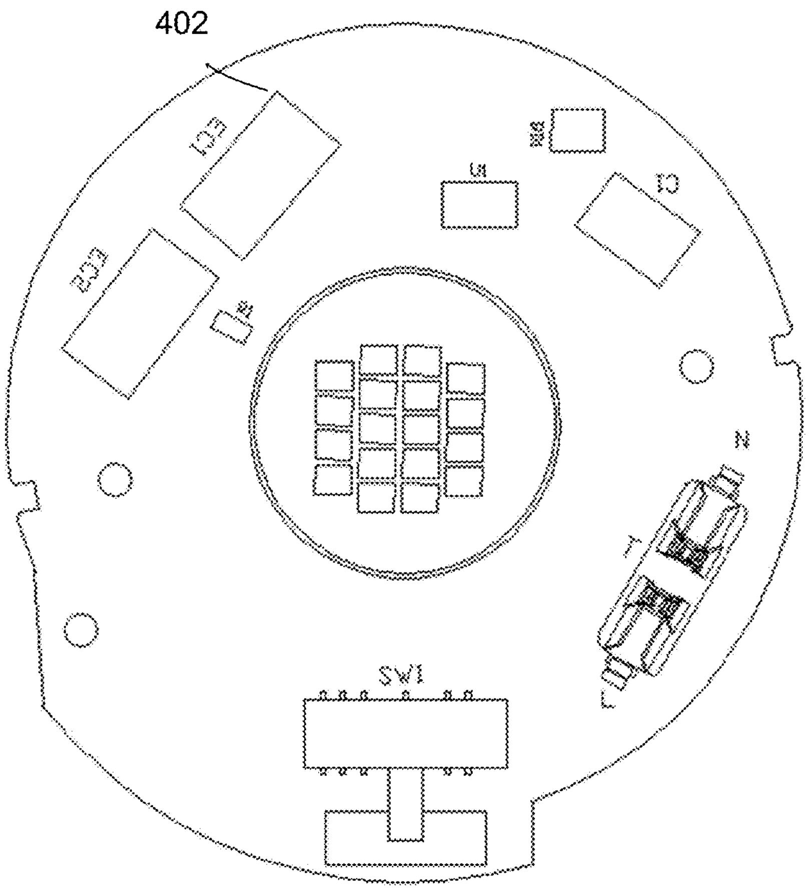
FIG. 5 illustrates a second type of a light source circuit board.

FIG. 5 shows a linear solution 402 in which the driving power is converted directly to driving currents supplied to the LED modules, without a conversion phase, thus to further reduce manufacturing cost.

Figure 7:
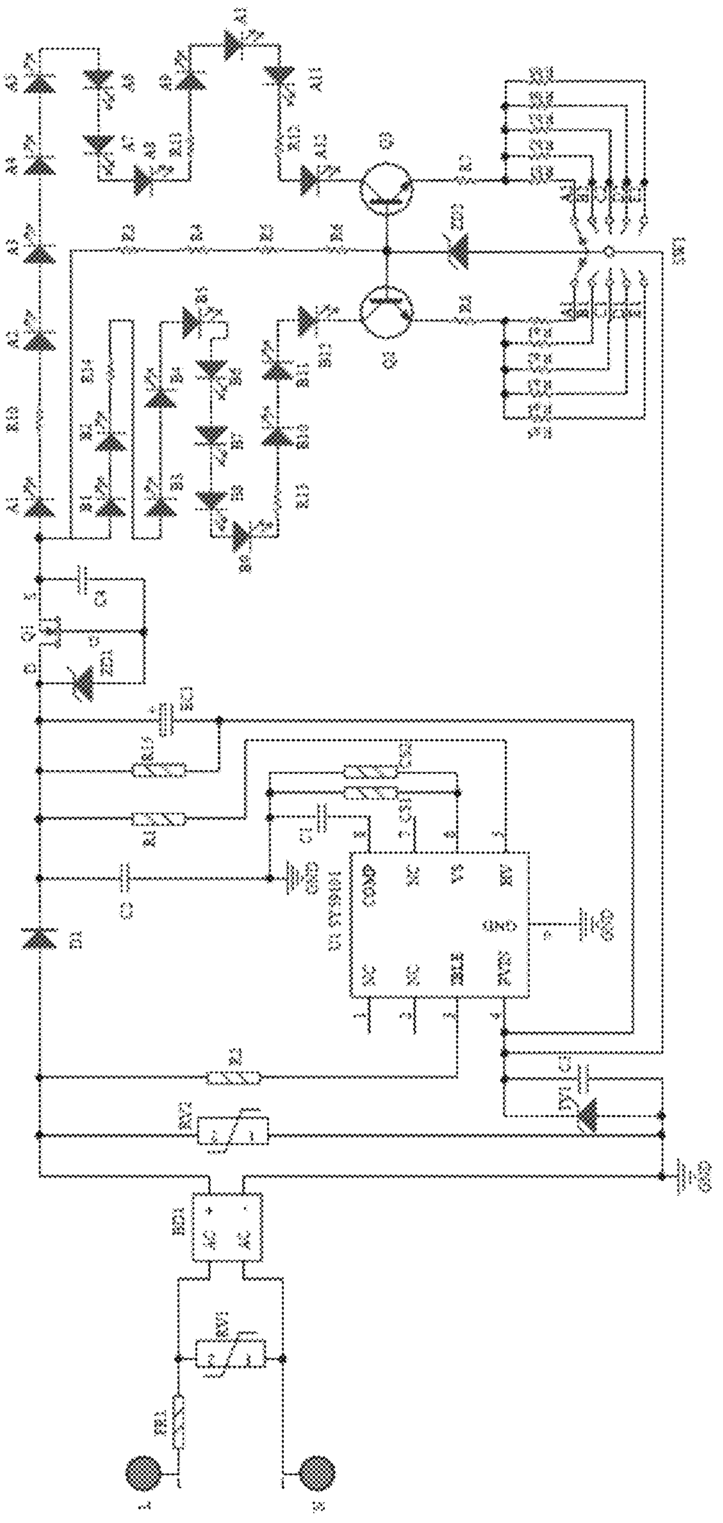
FIG. 7 illustrates another detailed circuit diagram example of a lighting apparatus.

FIG. 7 shows an example of a linear solution, in which no inductor-capacitor mechanism mentioned here are used in the driving circuit.

In some embodiments, a lighting apparatus includes a base plate, a driver module, a light source and a main housing.

The base plate includes a metal layer, an insulation layer, and a conductive path layer.

Figure 10:
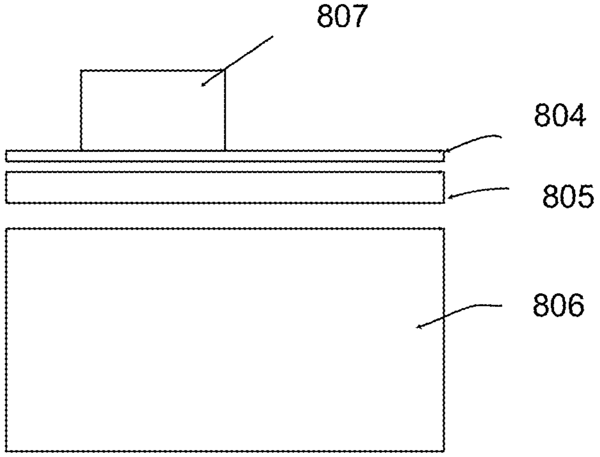
FIG. 10 is a side view of a base plate with multiple layers.

FIG. 10 shows a base plate comprising a conductive path layer 804, an insulation layer 805 and a metal layer 806.

The conductive path layer 804 is stacked above the insulation layer 805.

The insulation layer 805 is stacked above the metal layer 806.

The driver module 807 is disposed on a top surface of the conductive path layer 804.

The light source is also disposed on the top surface of the base plate.

The main housing encloses the base plate.

The metal layer 806 has a first thickness.

The conductive path 804 layer has a second thickness.

10% of the first thickness is larger than the second thickness. For example, when the conductive path layer 804 has a second thickness of 1 mm, the first thickness of the metal layer 806 is more than 10 mm.

Figure 9:
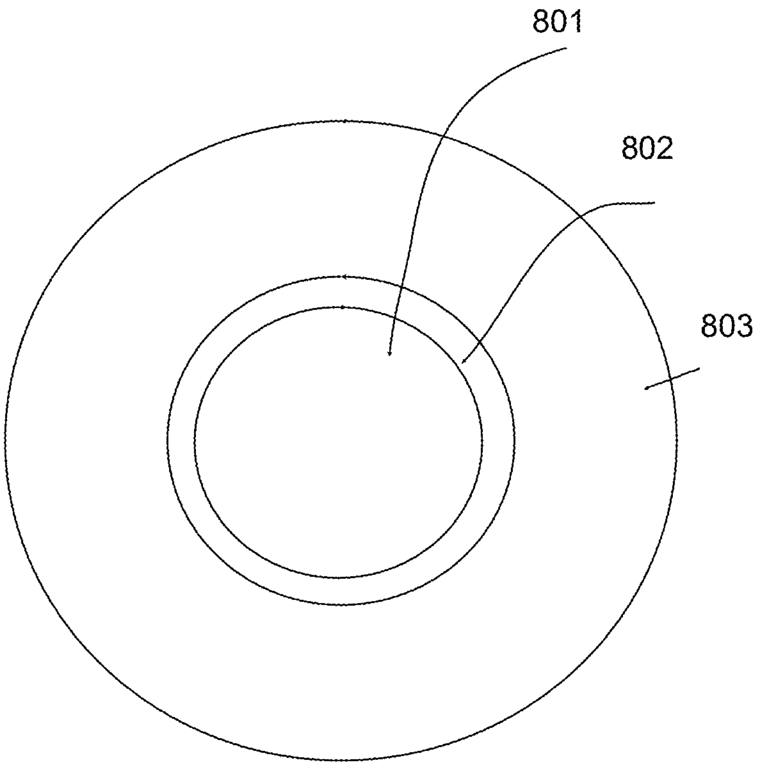
FIG. 9 shows a base plate structure with multiple sections respectively for guiding heat away of different components of the base plate.

In FIG. 9, the metal layer has a first section 801 and a second section 802.

The first section 801 and the second section 802 are separated with a heat insulation material 802.

The light source is placed above the first section 801 and the driver module is placed above the second section 802.

With such design, the heat of the light source and the driver module are handled separately. For example, the main housing has a heat sink thermally connected to the first section of the metal layer.

In some embodiments, the main housing is a cup shape with a light opening.

The base plate is disposed on an inner side of the main housing facing to the light opening.

In some embodiments, a power socket is placed on a back cover of the main housing.

A power wire is inserted to the power socket for guiding an AC power directly to the driver module disposed on the base plate.

Figure 13:
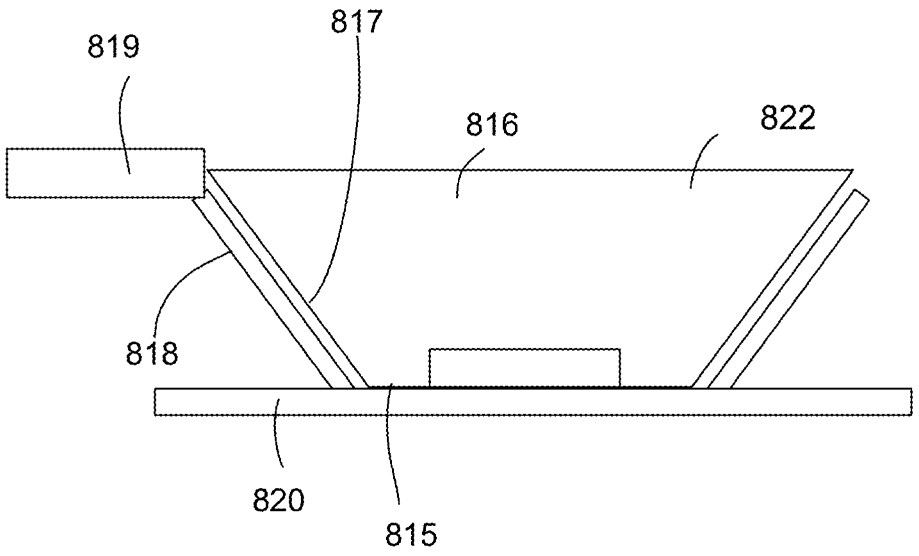
FIG. 13 shows a reflector cup structure.

In FIG. 13, a reflector cup 822 is placed for reflecting a light of the light source to the light opening.

The reflector cup 822 has a trumpet shape with a first reflector opening 815 facing to the light source and with a second reflector opening 816 facing to the light opening.

The second reflector opening 816 is larger than the first reflector opening 815.

The reflector cup separates the light source from the driver module on the base plate.

The reflector cup conceals the driver module behind the reflector cup so as the driver module is not visible from the light opening.

In some embodiments, the reflective cup has a reflective layer 817 and a thermal layer 818.

The reflective layer 817 faces to the light source to direct the light to the light opening.

The reflective cup 822 engages the base plate 820 to carry heat of the base plate to the main housing.

In some embodiments, the thermal layer 818 includes a metal material.

In some embodiments, the main housing has a rim part extending from the light opening for concealing an installation hole for installing the lighting apparatus.

An antenna is placed on the rim part connecting to the driver module for receiving an external command.

In some embodiments, an augment switch is integrated with the antenna and is placed on a bottom surface of the rim part exposed to be operated by a user when the lighting apparatus is installed in the installation hole.

Figure 12:
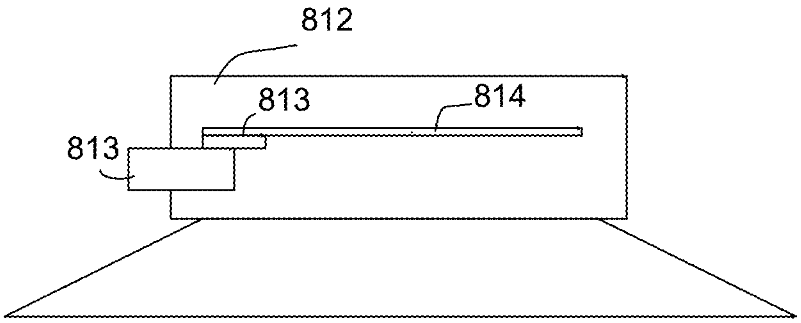
FIG. 12 shows a manual switch disposed on a lateral side of a lighting apparatus.

In FIG. 12, a mechanical switch 813 is placed on the base plate 814.

A manual switch 813 is placed on a lateral side of the main housing 812.

The manual switch 813 is partly exposed outside the main housing 812 for a user to select a state from multiple candidate states.

When the manual switch 813 is moved, the manual switch 812 carries the mechanical switch 813 to move to change an operation parameter of the driver module.

Figure 11:
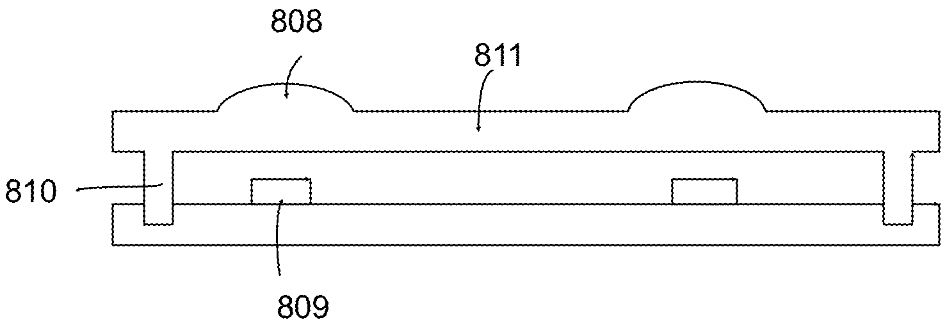
FIG. 11 shows a base plate covered with a lens layer.

In FIG. 11, a lens layer 811 is disposed above the light source 809. In this example, each LED chip 809 of the light source is stacked with a lens unit 808 for changing light direction of the LED chip 809 under the lens unit 808.

In some embodiments, a buckle structure 810 is disposed on the lens layer to align the lens layer with the light source.

Figure 14:
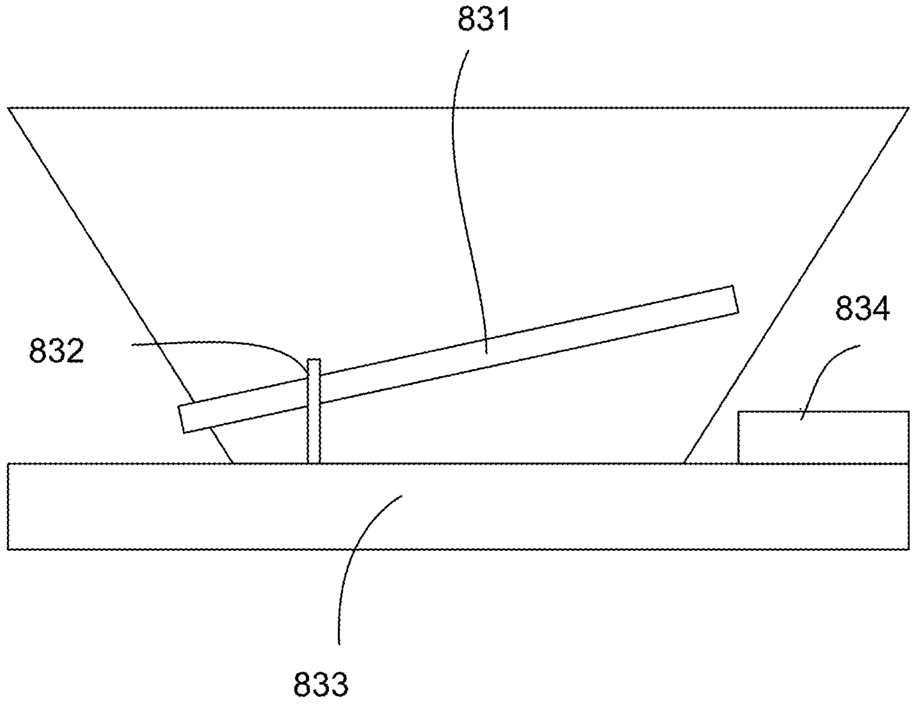
FIG. 14 shows a reflector with an antenna attached thereon.

In FIG. 14, a reflector cup 850 is placed on a base plate 833. An antenna 831 is attached on a surface of the reflector cup 850. A lead wire 832 is electrically connecting the antenna 831 to a wireless processor 834 of the driver module.

The wireless processor 834 handles a wireless command received from the antenna 831 so that the driver module may control the light operation, e.g. to change a color temperature, via an external device (now shown) like a remote control or a mobile phone installed with a control app.

Figure 15:
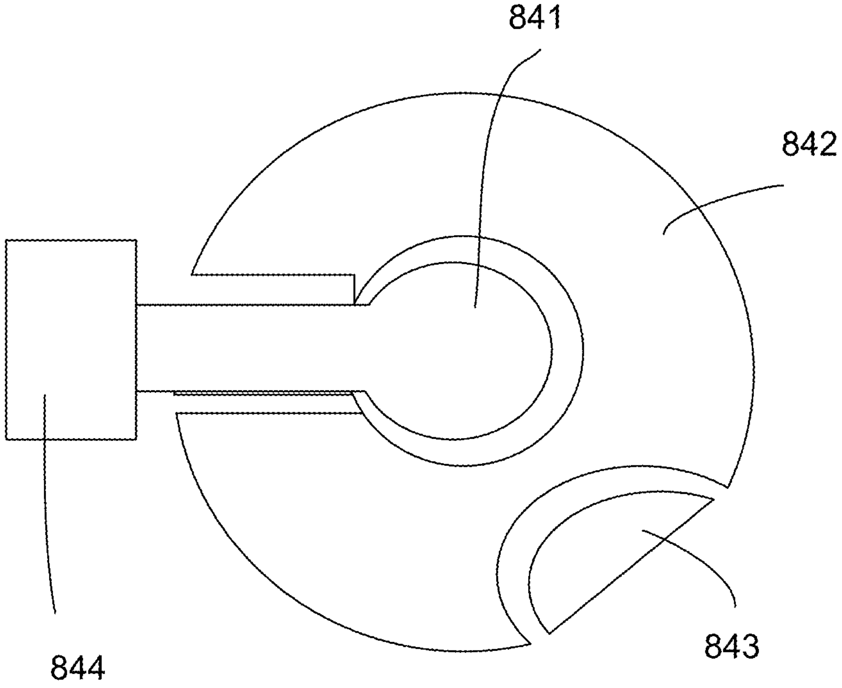
FIG. 15 shows a base plate with three sections for respectively handling heat dissipation of different types of components.

Compared with FIG. 9 where the metal layer is divided into a first section and a second section, FIG. 15 shows another embodiment where the metal layer is divided into three sections.

In FIG. 15, the metal layer is divided to a first section 841, a second section 842 and a third section 843. The first section 841 is used for carrying away heat of the light source. The second section 842 is used for carrying away heat of driver components like capacitor or power chip. There is a third section 843 placed below a wireless processor, which is more fragile than other components of the driver module. The third section 843 is used for carrying away heat of the wireless processor.

A heat sink 844 is used for routing heat of the first section 841. Similar designs may be used for handling heat of the second section 842 and the third section 843.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a base plate comprising a metal layer, an insulation layer, and a conductive path layer, wherein the conductive path layer is stacked above the insulation layer, wherein the insulation layer is stacked above the metal layer;

a driver module disposed on a top surface of the conductive path layer;

a light source also disposed on the top surface of conductive path layer of the base plate, wherein the light source is electrically connected to the driver module via the conductive path layer;

a main housing for enclosing the base plate, wherein the metal layer has a first thickness, wherein the conductive path layer has a second thickness, wherein 10% of the first thickness is larger than the second thickness; and a reflector cup placed above the base plate for separating the light source and the driver module, wherein an antenna is placed on a surface of the reflector cup and is electrically coupled to the driver module to receive a wireless command from an external device.

2. The lighting apparatus of claim 1, wherein the metal layer has a first section, a second section and a third section, wherein the first section, the second section and the third section are separated with heat insulation material, wherein the light source is placed above the first section and a driver component of the driver module is placed above the second section, wherein a wireless processor of the driver module is placed above the third section.

3. The lighting apparatus of claim 2, wherein the main housing has a heat sink thermally connected to the first section of the metal layer.

4. The lighting apparatus of claim 1, wherein the main housing is a cup shape with a light opening, wherein the base plate is disposed on an inner side of the main housing facing to the light opening.

5. The lighting apparatus of claim 4, wherein a power socket is placed on a back cover of the main housing, wherein a power wire is inserted to the power socket for guiding an AC power directly to the driver module disposed on the base plate.

6. The lighting apparatus of claim 4, wherein the reflector cup is placed for reflecting a light of the light source to the light opening, wherein the reflector cup has a trumpet shape with a first reflector opening facing to the light source and with a second reflector opening facing to the light opening, wherein the second reflector opening is larger than the first reflector opening, wherein the reflector cup separates the light source from the driver module on the base plate, wherein the reflector cup conceals the driver module behind the reflector cup so as the driver module is not visible from the light opening.

7. The lighting apparatus of claim 6, wherein the reflective cup has a reflective layer and a thermal layer, wherein the reflective layer faces to the light source to direct the light to the light opening, wherein the reflective cup engages the base plate to carry heat of the base plate to the main housing.

8. The lighting apparatus of claim 7, wherein the thermal layer comprises a metal material.

9. The lighting apparatus of claim 4, wherein the main housing has a rim part extending from the light opening for concealing an installation hole for installing the lighting apparatus, wherein another antenna is placed on the rim part connecting to the driver module for receiving an external command.

10. The lighting apparatus of claim 9, wherein an augment switch is integrated with said another antenna and is placed on a bottom surface of the rim part exposed to be operated by a user when the lighting apparatus is installed in the installation hole.

11. The lighting apparatus of claim 4, wherein a mechanical switch is placed on the base plate, wherein a manual switch is placed on a lateral side of the main housing, wherein the manual switch is partly exposed outside the main housing for a user to select a state from multiple candidate states, wherein when the manual switch is moved, the manual switch carries the mechanical switch to move to change an operation parameter of the driver module.

12. The lighting apparatus of claim 1, wherein a lens layer is disposed above the light source.

13. The lighting apparatus of claim 12, wherein a buckle structure is disposed on the lens layer to align the lens layer with the light source.

14. The lighting apparatus of claim 1, further comprising a mechanical switch and a manual switch, wherein the mechanical switch is disposed on the base plate, wherein the mechanical switch is coupled to the driver module, wherein the mechanical switch has multiple states to be selected, wherein the driver reads a selected state to control the light source, wherein a manual switch disposed on the main housing, wherein an operating part of the manual switch is exposed outside the main housing to be operated by a user, wherein a connecting part of the manual switch is coupled to the mechanical switch, wherein when a user moves the operating part of the manual switch, the connecting part of the manual switch carries the mechanical switch to change the selected state.

15. The lighting apparatus of claim 14, wherein a switch hole is disposed on the base plate for fixing the mechanical switch.

16. The lighting apparatus of claim 15, wherein the connecting part and the mechanical switch are coupled on a side of the base plate opposite to the top surface.

17. The lighting apparatus of claim 16, wherein the connecting part of the manual switch is a switch groove, wherein a protruding pin of the mechanical switch is inserted into the switch groove.

18. The lighting apparatus of claim 1, wherein the driver module comprises multiple driver circuits placed in a peripheral area of the base plate, wherein the light source is placed in a central area of the base plate.

19. The lighting apparatus of claim 18, wherein the multiple driver circuits comprise an electrolysis capacitor, wherein the electrolysis capacitor has two feet connected to the base plate, wherein the two feet of the electrolysis capacitor are bent more than 40 degrees.

20. The lighting apparatus of claim 19, wherein the electrolysis capacitor has a capacitor body kept non-contact to the top surface of the base plate.

* * * * *